(12) United States Patent
Sjölén (10) Patent No.: US 10,208,433 B2
(45) Date of Patent: Feb. 19, 2019

(54) HEATING DEVICE

(71) Applicant: Expertus Kemiteknik AB, Sundsvall (SE)

(72) Inventor: Lennart Sjölén, Sundsvall (SE)

(73) Assignee: EXPERTUS KEMITEKNIK AB, Sundsvall (SE)

( * ) Notice: Subject to any disclaimer, the term of this patent is extended or adjusted under 35 U.S.C. 154(b) by 80 days.

(21) Appl. No.: 15/361,506

(22) Filed: Nov. 28, 2016

(65) Prior Publication Data

US 2017/0081806 A1    Mar. 23, 2017

Related U.S. Application Data

(63) Continuation of application No. PCT/SE2015/050618, filed on May 28, 2015.

(51) Int. Cl.
  *E01C 11/26* (2006.01)
  *E01C 11/24* (2006.01)
  (Continued)

(52) U.S. Cl.
  CPC .............. *E01C 11/26* (2013.01); *E01C 11/24* (2013.01); *F24D 3/18* (2013.01); *F25B 30/06* (2013.01);
  (Continued)

(58) Field of Classification Search
  CPC ........ E01C 11/265; E01C 11/26; E01C 11/24; F24J 3/086
  See application file for complete search history.

(56) References Cited

U.S. PATENT DOCUMENTS 4,344,414 A * 8/1982 Balch .................. F24D 11/0221
                                                    126/638
5,081,848 A * 1/1992 Rawlings ................ E01C 11/26
                                                    165/45
(Continued)

FOREIGN PATENT DOCUMENTS

JP       2003261908 A      9/2003
JP       2003279193 A      10/2003
(Continued)

*Primary Examiner* — Benjamin F Fiorello
(74) *Attorney, Agent, or Firm* — Gabriela B. Tomescu, Esq.; Bergenstråhle & Partners AB (57) ABSTRACT

A heating device (1) comprising: an energy well (2), a heat pump (3) which is adapted to take up and transfer heat from the energy well (2) by the aid of a line from the energy well to the heat pump (3) for transport of anti-freeze liquid, a heat extraction device (4) connected to a heat pump (3) which selectively can be brought into a connected and a disconnected position, thaw coils (5) for thawing ground surrounding the thaw coils (5), in which the anti-freeze liquid is transportable, which thaw coils (5) selectively can be connected and disconnected to the line from the energy well to the heat pump (3), a heat exchanger (7) connected to the heat extraction device (4) adapted to selectively transfer heat to the thaw coils (5) by the aid of the heat extraction device (4), a control system (6) which is adapted for controlling the heating device (1) whereby low temperature heat from the energy well (2) alternatively high temperature heat from the heat pump (3) and the heat extraction device (4) selectively can be used for pre-heating, thawing, or maintenance heating ground surrounding the thaw coils (5).

15 Claims, 6 Drawing Sheets

(51) Int. Cl.
  *F24D 3/18* (2006.01)
  *F25B 30/06* (2006.01)
  F25B 25/00 (2006.01)
  F24T 10/10 (2018.01)

(52) U.S. Cl.
  CPC ...... *F24D 2200/11* (2013.01); *F24D 2200/14* (2013.01); *F24T 10/10* (2018.05); *F25B 25/005* (2013.01); *F25B 2339/047* (2013.01); *Y02B 10/20* (2013.01); *Y02B 10/40* (2013.01); *Y02B 10/70* (2013.01); *Y02E 10/16* (2013.01)

(56) References Cited

U.S. PATENT DOCUMENTS

| | | | | |
|---|---|---|---|---|
| 5,224,357 A | * | 7/1993 | Galiyano | F24J 3/081 165/45 |
| 5,368,092 A | * | 11/1994 | Rearden | A01G 25/06 165/45 |
| 5,461,876 A | * | 10/1995 | Dressler | F25B 5/02 62/160 |
| 2004/0016740 A1 | * | 1/2004 | McDonald | C09K 5/10 219/213 |
| 2006/0042781 A1 | * | 3/2006 | Ichiyama | E01C 11/26 165/45 |
| 2008/0173260 A1 | * | 7/2008 | Lange | F28D 15/0241 122/31.1 |
| 2009/0056244 A1 | * | 3/2009 | Caterina | A01G 13/06 52/169.11 |

FOREIGN PATENT DOCUMENTS

| | | |
|---|---|---|
| KR | 20100128452 A | 12/2010 |
| SE | 1100577 A1 | 2/2012 |

* cited by examiner

HEATING DEVICE

This application is the continuation of International Application No. PCT/SE2015/050618, filed 28 May 2015, which claims the benefit of Swedish Patent Application No. SE 1450646-3, filed 28 May 2014, the entire contents of which are hereby incorporated by reference.

TECHNICAL FIELD

The present invention relates generally to a heating device and a method for thawing ground.

BACKGROUND ART

There is a need to thaw ground in an energy efficient manner to reduce the risk of slipping, on airfields, garage and other driveways/slopes, approaches, roads, etc. Ground placed electrical coils have commonly been used but are increasingly being outcompeted by the cheap energy provided by geothermal heat pumps, wherein you arrange thaw coils with anti-freeze liquid instead of electrical coils.

A drawback of the known art is that thawing is energy consuming. The melting heat for ice is high (80 cal/gram) and frozen ground, especially at a high water content therefore requires also much energy for thawing, in addition to the ice and snow that may lay on the ground surface. If, at the same time, the weather is cold, much energy is lost to the surroundings. This is reinforced by wind and a relatively high humidity.

SUMMARY OF INVENTION

An object of the present invention is to alleviate some of the disadvantages of the prior art and to provide a heating device and a method which enable the thawing of ground in an energy efficient manner.

According to a first aspect of the invention, a heating device is provided, comprising an energy well, a heat pump which is adapted to take up and transfer heat from the energy well by the aid of a line from the energy well to the heat pump for transport of anti-freeze liquid, a heat extraction device connected to a heat pump which selectively can be brought into a connected and a disconnected position, thaw coils for thawing ground surrounding the thaw coils, in which the anti-freeze liquid is transportable, which thaw coils selectively can be connected and disconnected to the line from the energy well to the heat pump, a heat exchanger connected to the heat extraction device adapted to selectively transfer heat to the thaw coils by the aid of the heat extraction device, a control system which is adapted for controlling the heating device whereby low temperature heat from the energy well alternatively high temperature heat from the heat pump and the heat extraction device selectively can be used for pre-heating, thawing, or maintenance heating ground surrounding the thaw coils.

According to one embodiment, the energy well is at least one geothermal heating hole or alternatively solar panels.

According to another embodiment, the heat extraction device is a high power extraction device.

According to another embodiment, the anti-freeze liquid is a brine solution.

According to one embodiment, the heat pump is a property heat pump.

According to one embodiment, the control of the heating device is done manually, automatically, or based on weather data, wherein weather data comprises actual weather and/or weather forecast.

According to one embodiment, insulation material is arranged under the thaw coils.

According to one embodiment, a first valve A and a second valve B are arranged to, by the aid of opening and closing of the same, enable connecting and disconnecting of the thaw coils to the line from the energy well to the heat pump, for using low temperature heat from the energy well and high temperature heat from the heat pump and the heat extraction device respectively, whereby a third valve C is arranged for diverting of the flow through the line from the energy well to the heat pump via the thaw coils.

According to one embodiment, a bypass line BP with a circulation pump is arranged to form its own circuit together with the thaw coils and the line from the energy well to the heat pump, which circuit completely or partly circumvents the heat pump, wherein the flow can be varied in the circuit by the aid of the bypass line BP.

According to one embodiment, the thaw coils are connected to the line from the energy well to the heat pump in a serial connection way, or a parallel connection way.

According to one embodiment, the heat pump which is arranged to take up and transfer heat from the energy well, and the heat pump to which the heat extraction device is connected, is one and the same heat pump.

According to one embodiment, the heating device is adapted to selectively transfer heat to the thaw coils with an adjustable output.

According to one embodiment, supplying heat to the thaw coils from the energy well is carried out by keeping a first valve A and a second valve B open for connecting the thaw coils to the line from the energy well to the heat pump, or supplying heat to the thaw coils from the energy well is carried out by keeping a first valve A and a second valve B closed and a third valve C for diverting the flow through the line from the energy well to the heat pump is kept open and the heat extraction device is in a connected position.

According to one embodiment, the thaw coils are divided into at least two circuits, which preferably are adapted to be separately switched in or out.

According to a second aspect of the invention, a method for thawing ground is provided, the method comprising: supplying heat to the thaw coils from an energy well, or supplying heat to the thaw coils from a heat pump via a heat extraction device and a heat exchanger, whereby the method further comprises the step selecting one of the previous alternative steps.

According to one embodiment, supplying heat to the thaw coils from the energy well is carried out by keeping a first valve A and a second valve B open for connecting the thaw coils to the line from the energy well to the heat pump, wherein the alternative supplying heat to the thaw coils from the energy well is carried out by keeping a first valve (A) and a second valve B closed and a third valve C for diverting the flow through the line from the energy well to the heat pump is kept open and the heat extraction device is in a connected position.

Examples of advantages of the claimed invention is that it is well suited for villas etc., where energy and cost consciousness is high. The invention is also well suited for automatic control/connection to weather data.

The combination of using both LT (low temperature heat from the brine circuit) and high temperature heat from the heat pump and enable this by the aid of commonly available property heat pumps is used by the invention according to one embodiment. This provides an invention that in a cheap manner makes it possible to build energy efficient thawing devices.

The device is particularly well suited where the thawing need is greatest in connection to mild weather where ice slip and slush arise on driveways/slopes. In good time "free" maintenance heating can be supplied and heat—or if the brine solution is sufficiently warm—thaw the ground. Thereafter heat pump energy can be supplied for fast and further heating/melting away. When this has occurred brine solution may again be circulated in the coils and hold back new cooling. The speed of the entire process is improved when insulation is arranged under the coils. A certain depth is however needed outside to reduce the risk of freezing during quick weather changes when the thawing device is turned off.

BRIEF DESCRIPTION OF DRAWINGS

The invention is now described, by way of example, with reference to the accompanying drawings, in which.

DESCRIPTION OF EMBODIMENTS

In the following, a detailed description of the invention will be given. In the drawing figures, like reference numerals designate identical or corresponding elements throughout the several figures. It will be appreciated that these figures are for illustration only and are not in any way restricting the scope of the invention.

To reduce the losses to the surroundings and carry out a thawing med little use of energy it is worthwhile knowing that the use of thawing may vary:

1. Long-time/continuous thawing is very costly and is primarily used in commercial and public facilities.
2. Many are primarily in need of a temporary thawing. Thereby, less energy is used and is less costly. If the thawing can be carried out during a short time, which requires a high power/output the loss to the surroundings is short and therefore small. If insulation is arranged under the thaw coils, the heat loss into the ground can be reduced and the thawing be even faster.

According to one embodiment, the invention uses both low temperature thawing (with anti-freeze brine liquid from the energy well) and also separate thawing by the heat pump. In the latter case it is preferably carried out via a high power extraction device 4 such as e.g. connection for pool heating to minimize the time required and heat losses to the surroundings. To separate the systems (often water-and brine liquid respectively) from each other a heat exchanger may be used.

A first embodiment of a heating device according to the invention and associated operation modes will now be described with reference to FIG. 1 and FIGS. 1a-e. A heating device, generally designated 1, comprises an energy well 2, for example a geothermal source in the form of a heating hole, i.e., a bore hole. Alternatively, the energy well can be a solar energy device, such as solar panels. Furthermore, stored energy can also be used.

Figure 1:
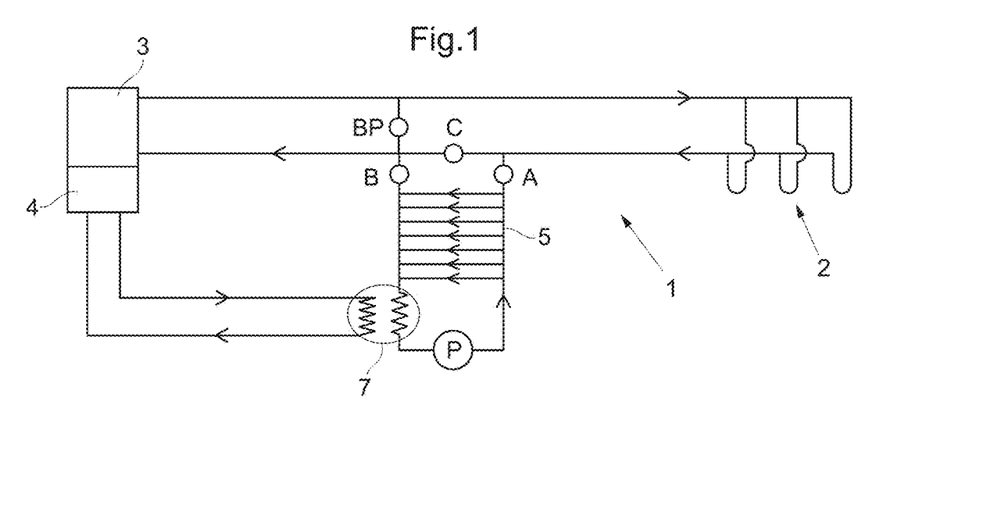
FIG. 1 shows an outline of a heating device according to a first alternative embodiment of the invention (Alt 1).

A heat pump 3 is adapted to take up and transfer heat from the energy well 2 by the aid of a line from the energy well to the heat pump 3 for transport of a liquid, preferably anti-freeze liquid, preferably a so called brine solution. The heat pump is preferably a property heat pump located in a residence building. A heat extraction device 4 is connected to the heat pump 3 which is adapted to selectively be brought into a connected and a disconnected position by means of valves (not shown). Thaw coils 5 are provided for thawing ground surrounding the thaw coils 5 in which the anti-freeze liquid is transportable. The thaw coils 5 are adapted to be selectively connected and disconnected to the line from the energy well to the heat pump 3. A heat exchanger 7 is connected to the heat extraction device 4 and is adapted to selectively transfer heat to the thaw coils 5 by the aid of the heat extraction device 4, which preferably is a high power extraction device. In order to increase the efficiency, insulation material is preferably arranged under the thaw coils.

The thaw coils can be divided into two or more circuits, which preferably are adapted to be separately switched in or out. This can for example be used for selectively thaw some of the surface area under with the thaw coils are provided, in order to save energy and to give priority to some parts. As another example, heated liquid in a thaw coil circuit, warmed by sunshine, for example, can be used for heating other parts of the system.

A circulation pump P is provided in parallel to the thaw coils 5 to force liquid to circulate there though. This circulation pump P is provided with a non-return valve for certain operation modes.

A control system (not shown in the figures) is adapted for controlling the heating device 1, whereby low temperature heat from the energy well 2 alternatively high temperature heat from the heat pump 3 and the heat extraction device 4 selectively can be used for pre-heating, thawing, or maintenance heating ground surrounding the thaw coils 5. The control of the heating device can be done manually, automatically, or based on weather data, wherein weather data comprises actual weather and/or weather forecast. Sensors measuring parameters in the system, such as temperature and flow, can be used for optimizing the energy use during thawing by controlling the directions of pumps and flow so that heat energy, for example from heated sections of the thaw coils, is used for heating other thaw coil sections or used for recharging the energy well.

The control system is connected to a first valve A, a second valve B, and a third valve C. The first and second valves A, B are arranged to, by means of opening and closing f the same, enable connecting and disconnecting of the thaw coils 5 to the line from the energy well 2 to the heat pump 3, for using low temperature heat from the energy well 2 and high temperature heat from the heat pump 3 and the heat extraction device 4 respectively. The third valve C is arranged for diverting of the flow through the line from the energy well 2 to the heat pump 3 via the thaw coils 5. To this end, the first and second valves A, B connect the thaw coils 5 to one of the lines interconnecting the heat pump 3 and the energy well 2 while the third valve C is provided in this line, between the connection points of the first and second valves A, B.

A bypass line BP with a circulation pump is preferably arranged to form its own circuit together with the thaw coils 5 and the line from the energy well 2 to the heat pump 3. This circuit completely or partly circumvents the heat pump 3, wherein the flow can be varied in the circuit by the aid of the bypass line BP. To this end, the bypass line BP is provide across the two lines interconnecting the heat pump 3 and the energy well 2, between the heat pump 3 and the third valve C.

Different operation modes for the heating device 1 shown in FIG. 1 will now be described with reference to FIGS. 1a-e. Initially, three operation modes referenced Case 1, Case 2, and Case 3, respectively, will be explained with reference to Table 1 below. In this table, the settings of the circulation pump P, the first, second, and third valves A, B, C and the heat extraction device 4.

TABLE 1

| Part | Case 1 | Case 2 | Case 3 |
|---|---|---|---|
| Circulation pump P (with non-return valve for case 2) | OFF | OFF | ON |
| Valves A, B | Closed | Open | Closed |
| Valve C | Open | Closed | Open |
| Heat extraction device 4 | OFF | OFF | ON |

Case 1: No Thawing Function is Used

Figure 1A:
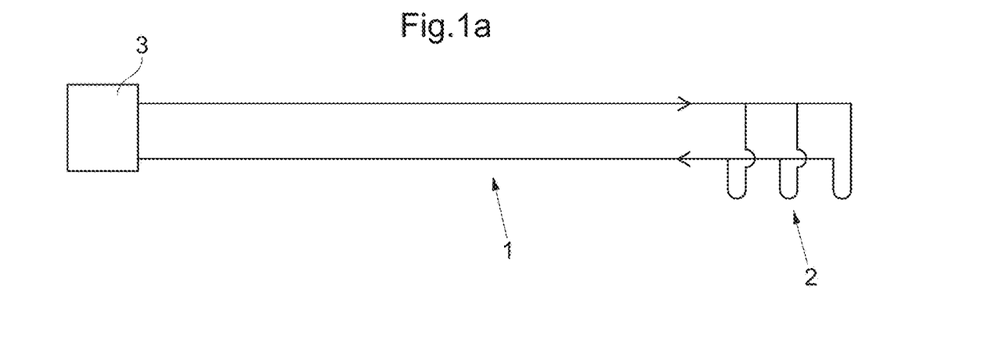
FIG. 1a shows an outline of a first operation mode of the first embodiment (case 1 of Alt 1).

In the first operation mode, shown in FIG. 1a, the heat pump 3, e.g. the geothermal heat pump, operates.

Case 2: Thawing Solely Using Brine Solution

Figure 1B:
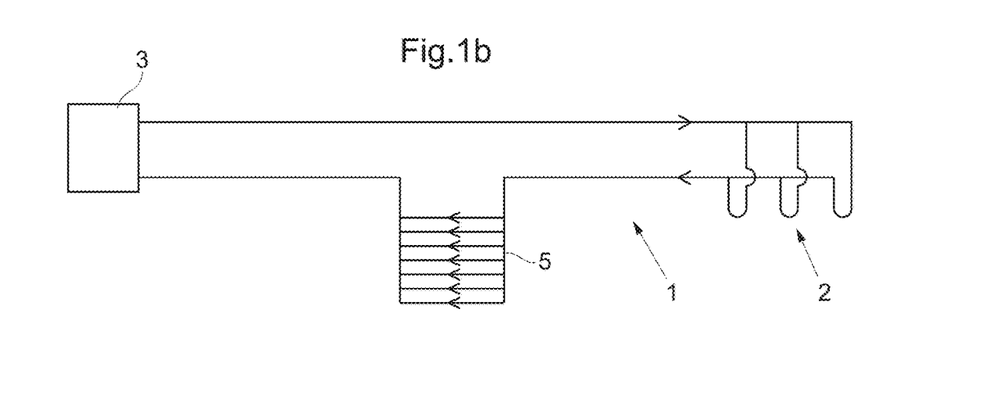
FIG. 1b shows an outline of a second operation mode of the first embodiment (case 2.1 of Alt 1).

In the second operation mode, shown in FIG. 1b, the heat pump 3, e.g. the geothermal heat pump, operates or the circulation pump in the heat pump 3 is mechanically operated, i.e. forced controlled during non-operation by the heat pump but when its circulation pump has to operate to provide circulation through the thaw coils. In this operation mode, the energy well 2 and the thaw coils 5 are connected in series.

Figure 1C:
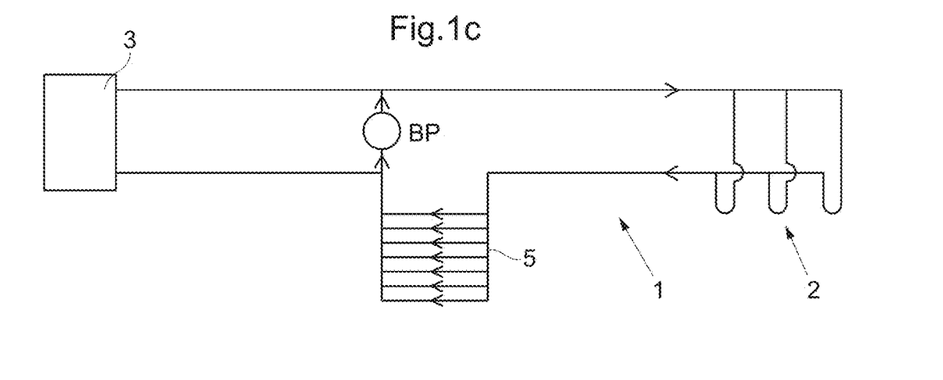
FIG. 1c shows an outline of a third operation mode of the first embodiment (case 2.2 of Alt 1).

In the third operation mode, shown in FIG. 1c, the heat pump 3 is arranged such that the circulation cannot be provided when it is turned OFF. The bypass circuit BP having its own circulation pump is provided in this case. As in the second operation mode, the energy well 2 and the thaw coils 5 are connected in series. However, the liquid is forced by means of the circulation pump in the bypass circuit BP and the heat pump is disconnected in some way (not shown).

Case 3: Thawing with Heat Pump Energy

Figure 1D:
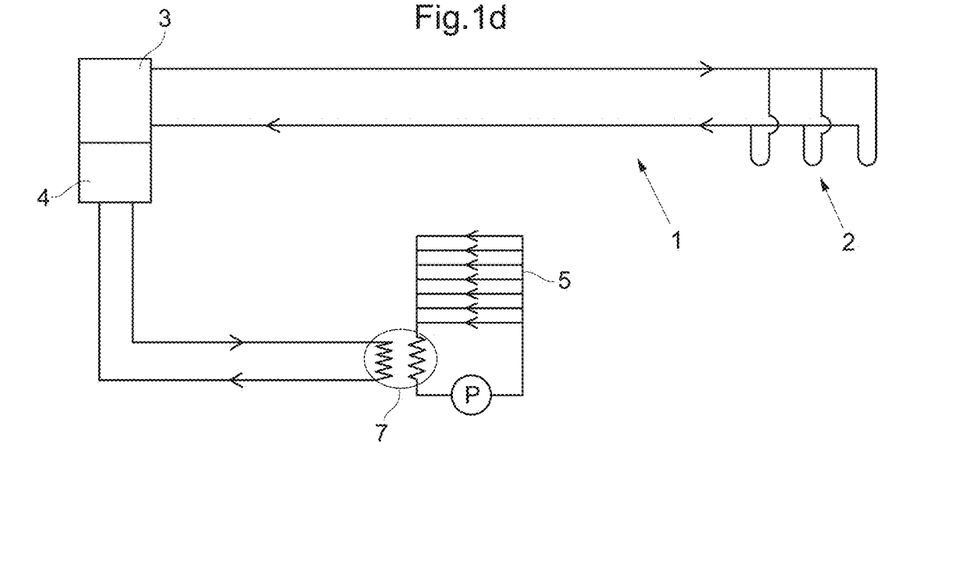
FIG. 1d shows an outline of a fourth operation mode of the first embodiment (case 3 of Alt 1).

In the fourth operation mode, shown in FIG. 1d, the heat pump 3, e.g. the geothermal heat pump, operates. The thaw coils 5 are disconnected from the energy well 2 by means of the valves A-C and the energy extraction device 4 provides the heat to the thaw coils 5 via the heat exchanger 7.

Figure 1E:
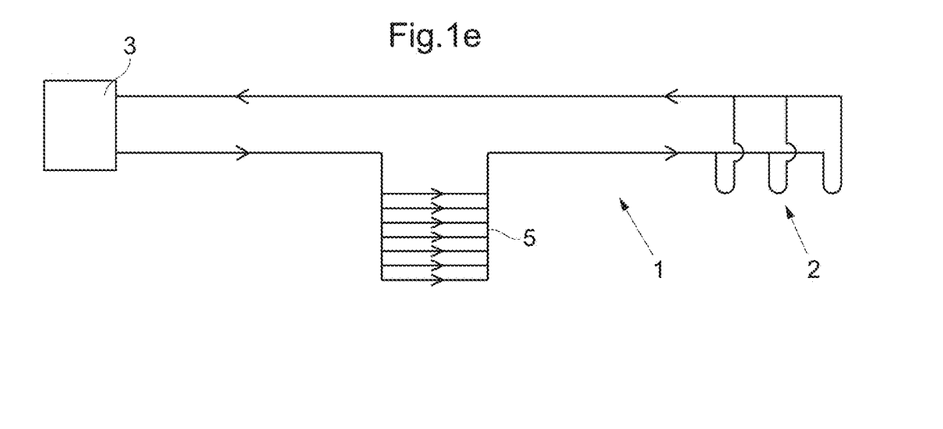
FIG. 1e shows an outline of a fifth operation mode of the first embodiment (case 4 of Alt 1).

In the fifth operation mode, shown in FIG. 1e, the heat pump 3, e.g. the geothermal heat pump, operates. This operation mode is similar to the second operation mode but with reversed direction of flow for the liquid. This can be achieved by means of switching valves (not shown) provided outside or in the heat pump 3. In this mode, heat from the thaw coils 5 can be used for recharging the energy well 2, for example during summer, when sunshine heats the thaw coils 5.

A second embodiment of a heating device according to the invention and associated operation modes will now be described with reference to FIG. 2 and FIGS. 2a-d. This second embodiment is similar to the first embodiment and like parts are given the same references.

Thus, in addition to the energy well 2, the heat pump 3, the energy extraction device 4, the thaw coils 5, and the heat exchanger 7, this second embodiment exhibits controllers or control units, R1 and R2, provided in the lines interconnecting the energy well 2 and the heat pump 3 and the thaw coils, respectively. These control units can e.g. comprise fixedly tuned valves or be controlled valves or circulation pumps. Also the bypass circuit BP (not shown in FIG. 2) can be a part of this control system.

Figure 2:
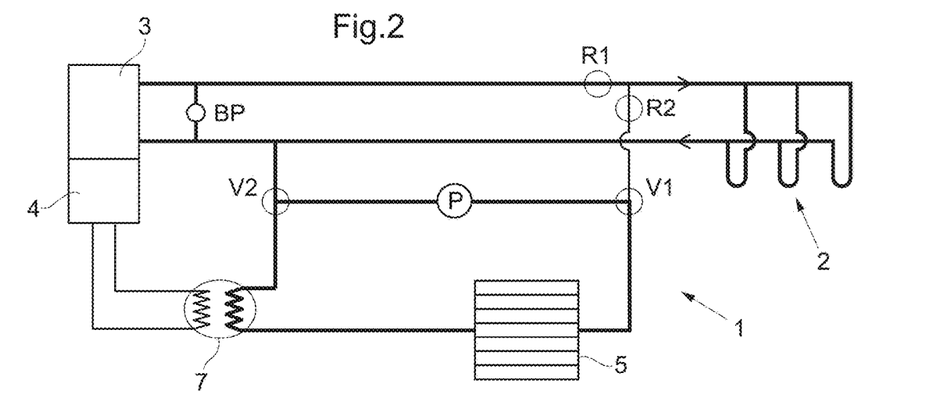
FIG. 2 shows an outline of a heating device according to a second alternative embodiment of the invention (Alt 2).

Different operation modes for the heating device shown in FIG. 2 will now be described with reference to FIGS. 2a-d. Four operation modes referenced Case 1, Case 2, and Case 3 (with two different operation modes), respectively, will be explained below.

Case 1: No Thawing Function is Used

Figure 2A:
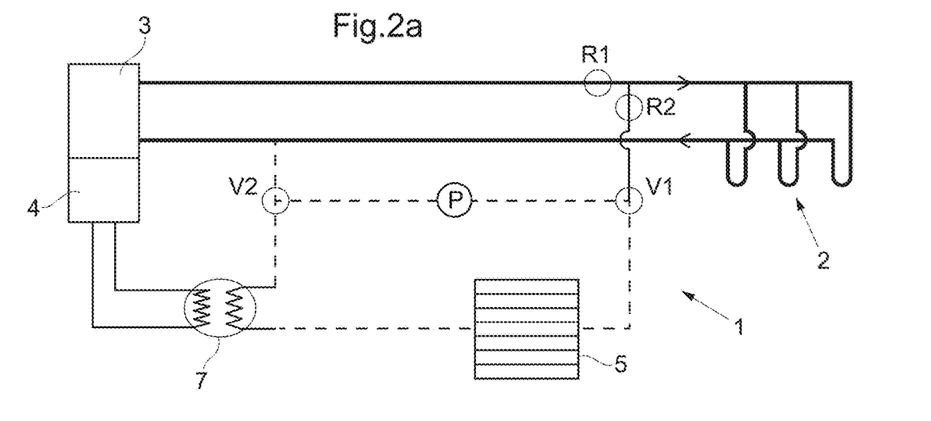
FIG. 2a shows an outline of a first operation mode of the second embodiment (Alt 2).

The heat pump 3, e.g. the geothermal heat pump, can operate, see FIG. 2a. This first operation mode is essentially identical to the first operation mode of the first embodiment described above with reference to FIG. 1a.

Case 2: Thawing Solely Using Brine Solution

Figure 2B:
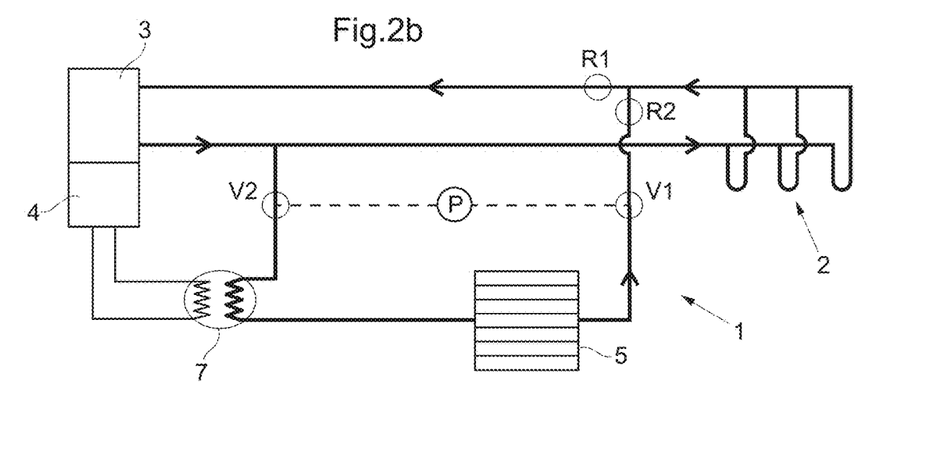
FIG. 2b shows an outline of a second operation mode of the second embodiment (case 2.1 of Alt 2).

In the second operation mode, shown in FIG. 2b, the heat pump 3, e.g. the geothermal heat pump, operates or the circulation pump in the heat pump 3 is mechanically operated, i.e. forced controlled during non-operation by the heat pump but when its circulation pump has to operate to provide circulation through the thaw coils. In this operation mode, the energy well 2 and the thaw coils 5 are connected in parallel. The distribution of fluid between the energy well 2 and the thaw coils 5 are controlled by means of the controllers R1 and R2.

Figure 2C:
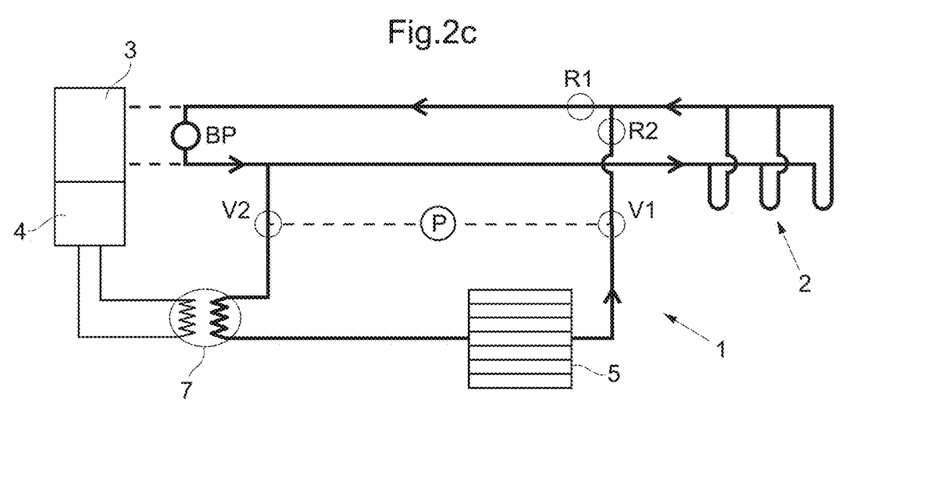
FIG. 2c shows an outline of a second operation mode of the second embodiment (case 2.2 of Alt 2).

In the third operation mode, shown in FIG. 2c, the heat pump 3 is arranged such that the circulation cannot be provided when it is turned OFF. The bypass circuit BP having its own circulation pump is provided in this case. As in the second operation mode, the energy well 2 and the thaw coils 5 are connected in parallel. However, the liquid is forced by means of the circulation pump in the bypass circuit BP and the heat pump is disconnected in some way (not shown).

Case 3: Thawing with Heat Pump Energy

Figure 2D:
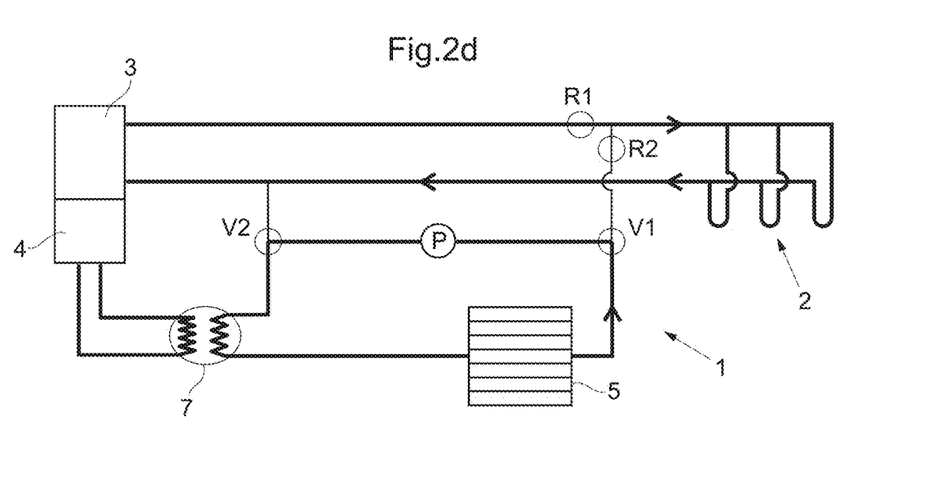
FIG. 2d shows an outline of a third operation mode of the second embodiment (case 3 of Alt 2).

In the fourth operation mode, shown in FIG. 2d, the heat pump 3, e.g. the geothermal heat pump, operates. The thaw coils 5 are disconnected from the energy well 2 by means of the valves V1 and V2 and the energy extraction device 4 provides the heat to the thaw coils 5 via the heat exchanger 7.

The first and second embodiments are different from each other in their operation modes with thawing solely using brine solution in that in the first embodiment the thaw coils are connected in series, i.e. connected in a serial connection way, to the energy wells and in the second embodiment they are connected in parallel, i.e. connected in a parallel connection way.

An advantage of the first embodiment is a simpler system than the second embodiment. There is no need for controlling/distribution between parallel circuits.

An advantage of the second embodiment is the possibility to adjust the flow between the parallel circuits which enables a better optimization in different situations. For instance, a forced flow through the thaw coils 5 provides a more uniform heat transfer to different parts in the thawing system.

A third embodiment of a heating device according to the invention and associated operation modes will now be described with reference to FIG. 3 and FIGS. 3*a-d*. This third embodiment is similar to the first and second embodiments and like parts are given the same references.

Figure 3:
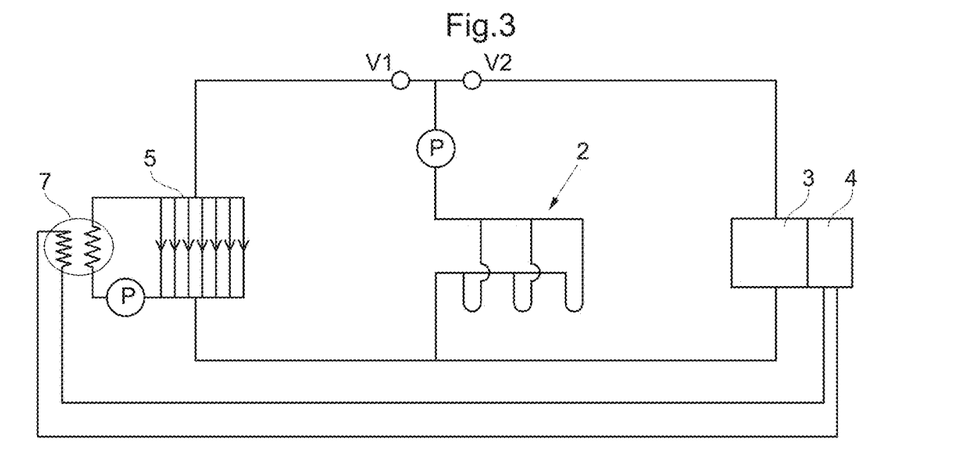
FIG. 3 shows an outline of a heating device according to a third alternative embodiment of the invention (Alt 3).

Thus, in addition to the energy well 2, the heat pump 3, the energy extraction device 4, the thaw coils 5, and the heat exchanger 7, this third embodiment exhibits a separate pump P for driving fluid through the energy well 2. Also, the energy well 2 and the thaw coils 5 are connected to the heat pump 3 in such way that fluid can be brought to flow in a circuit comprising the energy will 2 and the thaw coils 5 without passing the heat pump 3.

Different operation modes for the heating device shown in FIG. 3 will now be described with reference to FIGS. 3*a-d*. Four operation modes referenced Case 1, Case 2, and Case 3 (with two different operation modes), respectively, will be explained below.

Case 1: No Thawing Function is Used

Figure 3A:
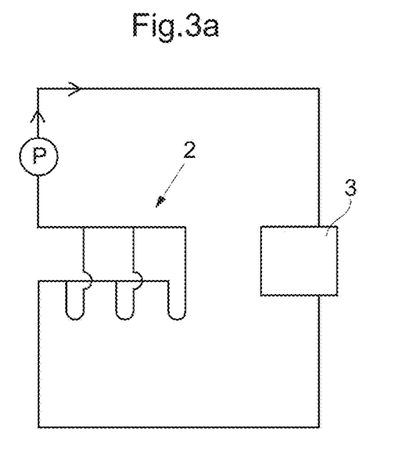
FIG. 3a shows an outline of a first operation mode of the third embodiment (Alt 3).

The heat pump 3, e.g. the geothermal heat pump, can operate, see FIG. 3*a*. This first operation mode is essentially identical to the first operation mode of the first embodiment described above with reference to FIG. 1*a*.

Case 2: Thawing Solely Using Brine Solution

Figure 3B:
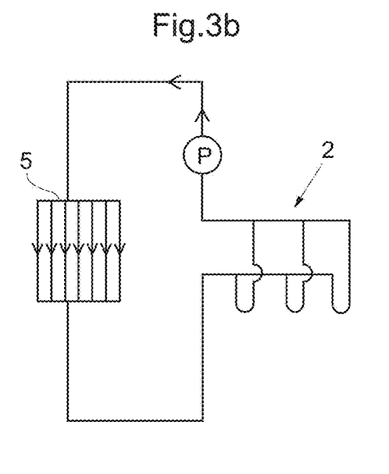
FIG. 3b shows an outline of a second operation mode of the third embodiment (case 2.1 of Alt 3).

In the second operation mode, shown in FIG. 3*b*, the heat pump 3, e.g. the geothermal heat pump, operates or the circulation pump in the heat pump 3 is mechanically operated, i.e. forced controlled during non-operation by the heat pump but when its circulation pump has to operate to provide circulation through the thaw coils. In this operation mode, the energy well 2 and the thaw coils 5 are interconnected.

Figure 3C:
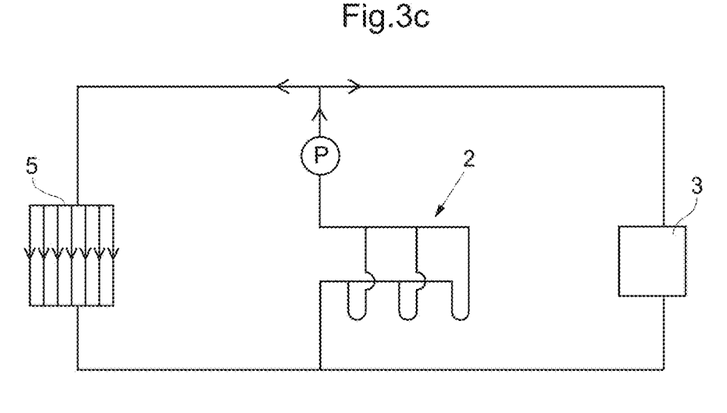
FIG. 3c shows an outline of a second operation mode of the third embodiment (case 2.2 of Alt 3).

In the third operation mode, shown in FIG. 3*c*, the heat pump 3 is arranged such that circulation thorough the energy well 2 is achieved for heating the building. Also, the energy well 2 provides energy for heating the thaw coils 5 by circulating fluid by means of the pump P through the circuit formed by the energy well 2 and the thaw coils 5.

Case 3: Thawing with Heat Pump Energy

Figure 3D:
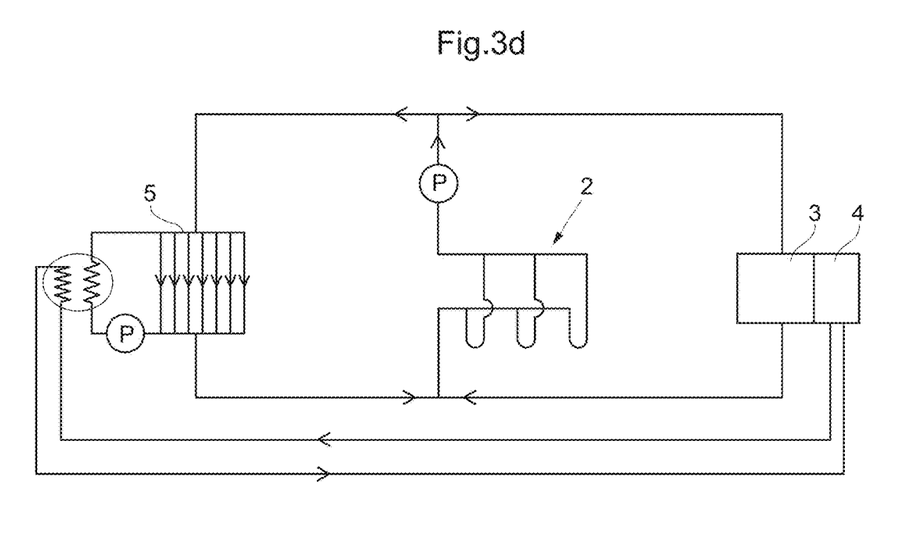
FIG. 3d shows an outline of a third operation mode of the third embodiment (case 3 of Alt 3).

In the fourth operation mode, shown in FIG. 3*d*, the heat pump 3, e.g. the geothermal heat pump, operates. The energy extraction device 4 provides the heat to the thaw coils 5 via the heat exchanger 7.

Preferred embodiments of a heating device 1 according to the invention have been described. However, the person skilled in the art realizes that these can be varied within the scope of the appended claims without departing from the inventive idea.

All the described alternative embodiments above or parts of an embodiment can be freely combined without departing from the inventive idea as long as the combination is not contradictory. Thus, the circuits of the first, second and/or third embodiments can be combined into one system by the use of appropriate conduits and connections.

REFERENCES IN THE FIGURES

1: Heating device
2: Energy well (e.g. bore hole)
3: Heat pump
4: Heat extraction device
5: Thaw coils
7: Heat exchanger
A, B, C: Valves
R1, R2: Controllers
V1, V2: Valves
BP: Bypass valve
P: Pump

The invention claimed is:

1. A heating device comprising:
   an energy well,
   a heat pump which is adapted to take up and transfer heat from the energy well by aid of a line from the energy well to the heat pump for transport of anti-freeze liquid,
   a heat extraction device connected to a heat pump which selectively can be brought into a connected and a disconnected position,
   thaw coils for thawing ground surrounding the thaw coils, in which the anti-freeze liquid is transportable, which thaw coils selectively can be connected and disconnected to the line from the energy well to the heat pump,
   a heat exchanger connected to the heat extraction device adapted to selectively transfer heat to the thaw coils by the aid of the heat extraction device,
   a control system which is adapted for controlling the heating device whereby lower temperature heat from the energy well alternatively higher temperature heat from the heat pump and the heat extraction device selectively can be used for pre-heating, thawing, or maintenance heating ground surrounding the thaw coils.

2. The heating device according to claim 1, wherein the energy well is any of the following: at least one geothermal heating hole and a solar panel.

3. The heating device according to claim 1, wherein the heat extraction device is a high power extraction device, such as a connection for pool heating.

4. The heating device according to claim 1, wherein the anti-freeze liquid is a brine solution.

5. The heating device according to claim 1, wherein the heat pump is a property heat pump.

6. The heating device according to claim 1, wherein the control of the heating device is done manually, automatically, or based on weather data, wherein weather data comprises actual weather and/or weather forecast.

7. The heating device according to claim 1, wherein insulation material is arranged under the thaw coils.

8. The heating device according to claim 1, wherein a first valve and a second valve are arranged to, by the aid of opening and closing of the same, enable connecting and disconnecting of the thaw coils to the line from the energy well to the heat pump, for using low temperature heat from the energy well and high temperature heat from the heat pump and the heat extraction device respectively, whereby a third valve is arranged for diverting of the flow through the line from the energy well to the heat pump via the thaw coils.

9. The heating device according to claim 1, wherein a bypass line with a circulation pump is arranged to form its own circuit together with the thaw coils and the line from the energy well to the heat pump, which circuit completely or partly circumvents the heat pump, wherein the flow can be varied in the circuit by the aid of the bypass line.

10. The heating device according to claim 1, whereby the thaw coils are connected to the line from the energy well to the heat pump in a serial connection way, or a parallel connection way.

11. The heating device according to claim 1, wherein the heat pump which is arranged to take up and transfer heat from the energy well, and the heat pump to which the heat extraction device is connected, is one and the same heat pump.

12. The heating device according to claim 1, which is adapted to selectively transfer heat to the thaw coils with an adjustable output.

13. The heating device according to claim 1, wherein the thaw coils are divided into at least two circuits.

14. A method for thawing ground with the aid of the heating device, according to claim 1, the method comprising:

selectively supplying heat to the thaw coils from an energy well, with the aid of a control system of the heating device, adapted for controlling the heating device, and alternatively, selectively supplying heat to the thaw coils from a heat pump via a heat extraction device and a heat exchanger, with the aid of the control system.

15. The method for thawing ground according to claim 14, wherein supplying heat to the thaw coils from the energy well is carried out by keeping a first valve and a second valve open for connecting the thaw coils to the line from the energy well to the heat pump, wherein the alternative supplying heat to the thaw coils from the heat pump is carried out by keeping a first valve and a second valve closed and a third valve for diverting the flow through the line from the energy well to the heat pump is kept open and the heat extraction device is in a connected position.

* * * * *